June 23, 1970  E. SCHLUETER  3,516,125
FASTENER MOUNTING
Filed Sept. 19, 1968
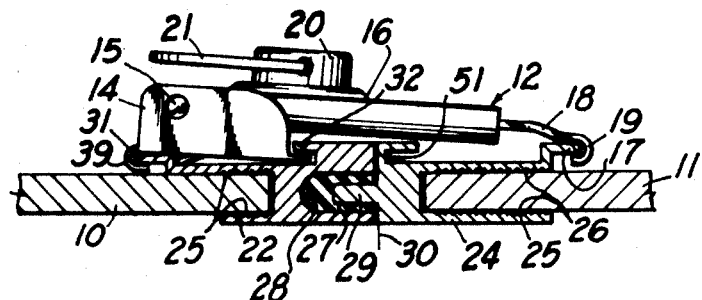
Fig 1
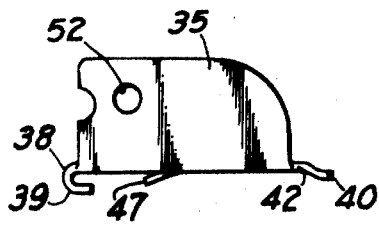
Fig 2
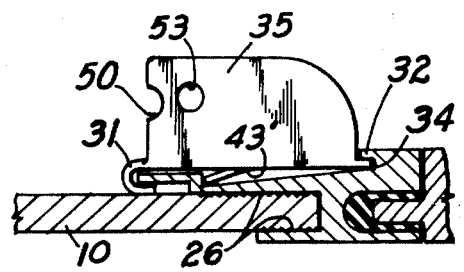
Fig 4
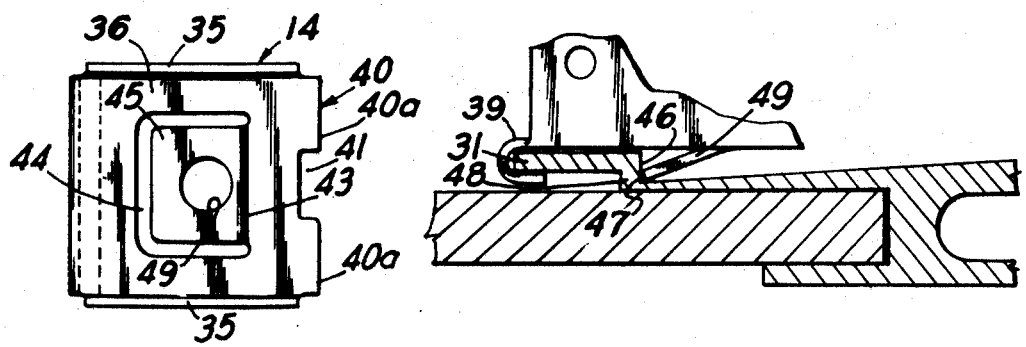
Fig 3
Fig 5
INVENTOR
ERNEST SCHLUETER
by
Agent United States Patent Office 3,516,125
Patented June 23, 1970

3,516,125
FASTENER MOUNTING
Ernest Schlueter, 74 Edwards Road,
Troy, N.Y. 12180
Filed Sept. 19, 1968, Ser. No. 760,835
Int. Cl. A44b 21/00
U.S. Cl. 24—73                    10 Claims

ABSTRACT OF THE DISCLOSURE

A bracket for carrying a rectractable hasp member mounted on a novel edging strip for a panel without need for holes. Novel means for mounting the bracket on the strip include a tongue in a strip channel and a hook over a strip flange to take the load, and a lock prong to hold the hook and tongue in such position. Usual fastening action may be used to mount the bracket.

BACKGROUND OF THE INVENTION

Field of the invention

Retractable hasp fastener bracket mounting.

Description of the prior art

Containers having a mating box and cover, each provided with respectively interfitting gasketed rims or edgings of extruded aluminum are shown in my Pat. No. 2,837,365 of June 3, 1958. The respective edgings carry rotary bolt and keep means which require careful alinements and are essentially made at the time of manufacture of the container because of the need for keeper slots in one edging and riveting the bolt means on the other.

A form of retractable hasp fastener having a hooked end engaging a keeper hook is known and described in my Pat. No. 2,820,995 of Jan. 28, 1958, the particular type shown therein being spring loaded. The mounting bracket for the hasp in the patent requires the use of screws for its mounting as does the keeper hook.

Since panels to be fastened together, whether they are simple adjacent panels in a wall or portions of a container, must often be substantially fluid-tight, the mounting of a fastener on the panel or container, especially in the field, must be done with great care if rivets, screws or bolts are needed because their use often permits leaks. This is especially true of packing cases which are liable to fall into water, and of panels used in knock-down portable houses.

The present invention overcomes these objections because the panels or casing having the interfitting edging members may have any number of fasteners mounted anywhere thereon without the need of any holes being made in the edging members or panels. Furthermore the fasteners can be removed without damage to the edging or fasteners. An in many instances no tools or fixtures are needed for mounting the fastener bracket, an advantage most desirable in the field.

SUMMARY OF THE INVENTION

Panel edging members meet at a joint, the edging member carrying a fastener bracket is provided with a channel opening away from the joint and generally near thereto and an off-set flange more remote from the joint. The base of the bracket has at one end one or more tongues as extensions of the base and received in the channel. As the opposite end of the base, a hook, likewise an extension of the base, engages over the off-set flange. Hence the bracket may be mounted by essentially simultaneous insertion of the tongue into the channel and hooking the hook over the flange. Slightly before the hook, or the tongue, reaches position to carry a fastener load, a resilient locking prong integral with the mid portion of the base but partially cut out and displaced normally inwardly therefrom, springs into engagement with the inner wall of the edging member at the off-set of the flange to prevent removal of the bracket.

BRIEF DESCRIPTION OF THE DRAWING

FIG. 1 shows the fastener used with two panels having edging members;
FIG. 2 is a side view of the fastener bracket;
FIG. 3 is a plan of the bracket;
FIG. 4 shows a modification of the bracket and an edging member, and
FIG. 5 is a fragmental view of the invention on an enlarged scale.

DESCRIPTION OF THE PREFERRED EMBODIMENTS

FIG. 1, depicting the invention in a setting similar to that shown in my Pat. 2,820,995, shows two panels 10 and 11 in a common plane secured by the fastener 12. The fastener comprises a novel bracket 14, though of a general type shown in my Pat. No. 2,820,995, secured fast with respect to the panel 10 pivotally carrying at 15 a hasp member 16 slidably receiving a retractable member 18 having a hook 19 for engaging a keeper member 17 substantially fast with respect to panel 11. The member 18 is extendable from, and retractable toward, the hasp member 16 by a turnable stud 20 thereon manually operated by means of a liftable butterfly handle 21.

The details of the hasp and retractable members 16 and 18, together with the stud, are all shown in Pat. No. 2,820,995 and are per se, not the invention.

The fastener is used in connection with novel edging members 22 and 24 on the panel members 10 and 11 respectively. The edging members are preferably of extruded aluminum and both have deep wide grooves 25 to receive the marginal portions of the panels 10 and 11, preferably leakproof, as by securing the edging members on the panel margin by epoxy cement, welding and the like at 26 (FIG. 4). The use of rivets and the like is not precluded for the invention is useful because mounting of the bracket requires no screws or the like. One edging member such as 22 is provided with a groove 28 having suitable packing 27 therein and opening oppositely from the deep groove in the edging member to receive a tongue 29 on the edging member 24 of the adjoining panel forming a juncture on each side of the tongue in the plane 30.

For mounting the bracket 14, the edging member 22 is provided with two outwardly off-set flanges 31 and 32 extending away from the plane 30 in the same direction to provide a narrow reception channel 34 extending the length of the edging member 22.

The bracket 14 includes two upstanding side ears 35 integral with a base 36, the latter overlaying part of the edging member 22 and constituting an improvement of the base shown in my Pat. No. 2,820,995.

The base 36 lies between the ears 35, and is substantially flat and at one end includes an integral extension 38 having a downwardly turned hook portion 39 to engage of the off-set flange 31, while the other end 40 of the base projects past the ears to engage in the reception channel 34. The distance between the hook portion 39 and the end 40 relative to the depth of the slot 34 and position of the flange 31 is such that end 40 is well seated in the reception slot when the hook engages over the flange 31. Thus the bracket may be mounted on, and anywhere along the length of, the edging member 22 by the described insertion and hooking action (rightward motion in the drawing).

According to the dimension of the edging member 22, it may be desirable that the end 40 have a bend as at 42 to provide a slightly resilient fit in the channel. The end 40 is preferably divided by a notch 41 providing tongue ends 40a which can yield independently of each other.

In order to insure that the bracket not become unintentionally detached from the edging member 22, the base is provided with a somewhat U-shaped cut-out 44 to leave therein a rectangular locking prong 45 which is permanently bent below the plane of the base along the line 43. The prong extends toward the hook 39 so that when the bracket is being mounted the prong rides over the off-set flange 31 and is resiliently bent toward the plane of the base, then when the end 40 and hook 39 are adequately engaged on the edging member 22 the prong resiliently returns to near normal position and its end 47 may abut against the inner wall 46 of the outstanding portion 48 forming the off-set flange 31 (FIG. 5) and thus substantially prevent leftward motion of the bracket. In practice it is not difficult to dimension the bracket and edging member 22 so that there is substantially no detectable space between the wall 46 and prong end 47 when the bracket is secure in the member 22. If the bracket is to be removed, a pointed tool may be inserted through an aperture 49 in the middle of the prong to pry the prong clear of the wall 46 so that the bracket can be moved leftward.

The material of the bracket may be varied according to mechanical requirements. For stampings to make brackets with a base of the order of 1 inch square, 0.040 inch stock of SAE 4130 steel has proved quite satisfactory. The same steel of 0.067 inch stock for bases about 1½ inches nearly square has also proved to be satisfactory. Spring steel may be used also.

The profile of the edging member can be changed as shown in FIG. 4, yet it still has a flange 31, a retaining reception channel 34 and the wall 46.

Only an outer end part of the prong need be permanently bent out of the plane of the base as shown at 43′ in FIG. 4. Large brackets of thick stock may have U slots in the ears as at 50 to receive a transverse rod to take the blow of a hammer driving the bracket into locked position, or to receive cords and the like as slings for containers or as rough-positioning pull cords. The end 40 may be flat as shown in FIG. 4.

While the cross section of the edging member 24 is not generally as important as that of 22 except for the provision of an outwardly directed off-set flange as the keeper member 17, it is desirable that members 22 and 24 be able to mate flush exteriorly at a common line to reduce collection of falling water or the like. An off-set flange such as at 51 to mate with flange 32 is useful for the purpose. Furthermore, the flange 51 may serve as a preliminary keeper for the hook 19 so that if the fastener is, say, to secure a cover on a container holding compressible contents, the cover could be held down by engagement of the preliminary keeper and after the contents had yielded, the container could then be tightly closed. This closing by stages may be done whether or not the hasp is spring-loaded as is shown in my Pat. 2,820,995 wherein the ears have oval hasp bearings as at 52 (FIG. 2) or round bearings without possible yielding as at 53 (FIG. 4).

With the present invention it is possible to draw the panels partially together with a fastener having a hasp of great reach and then draw the panels tight with other fasteners having lesser reach, and then remove the first fasteners intact without damaging the edging members.

The retraction of the hook 19 in fasteners of this type is necessarily rather limited and is hardly ever more than about half an inch. But such fasteners have been used in a great variety of climates for containers and quickly set up and knocked down housings, and it has been found that the almost complete dispensation with the need for tools to mount the fasteners makes the fasteners more desirable when additional fasteners must be added at a joint. The bracket can be "self-mounting" in that by fast hooking the hasp hook 19 over the flange 17, or 51, relative retraction of the member 18 draws the bracket into mounted position on the edging member 22.

I claim:

1. In combination, a pair of substantially coplanar panel members near each other and on opposite side of a plane of juncture, one of the panel members being provided with an edging member secured fast thereon; the edging member having a reception channel opening away from said plane of juncture and a flange off-set from said one of the panel members and also projecting away from, and more remote than said channel from, the plane of juncture, the edging member having an outstanding portion carrying the flange; a bracket having a generally approximately flat rectangular base of sheet material on the edging member, one end of the base having at least one tongue seated in the reception channel and the opposite end of the base being in the form of a hooking flange hooked over the off-set flange; the base being partially cut out to provide a locking prong extending away from the plane of juncture, and at least partially displaced below the base to engage against said outstanding portion of the edging member to prevent the tongue and hooking flange from moving appreciably in the direction away from the plane of juncture; retractable fastening means mounted on the bracket, and keeper means on the other panel member for engagement with the fastening means.

2. A combination as claimed in claim 1, the edging member being substantially flat between the reception channel and the outstanding portion.

3. A combination as claimed in claim 2, the reception channel opening, and the off-set flange extending outwardly, generally parallel with the panels.

4. A combination as claimed in claim 1, the bracket base being of slightly resilient material and the locking prong being normally displaced below the base to a sufficient degree so that during assembly of the combination when the base is moved over the off-set flange toward the plane of juncture for the tongue to seat in the channel and the hooking flange to engage the off-set flange, the prong is displaced toward the base, and when the base is so seated and hooked the prong springs away from the base and into locking position.

5. A combination as claimed in claim 1, the tongue and base being coplanar.

6. A combination as claimed in claim 1, the tongue having a bend therein to provide a tight fit in the channel.

7. A combination as claimed in claim 2, the locking prong being provided with a hole therethrough and the prong being bent to prevent the prong from lying flat upon the edging member so that a tool may be inserted through the hole to pry the prong out of engagement with said outstanding flange for removal of the bracket from the edging member.

8. A combination as claimed in claim 4, said bracket including substantially symmetrical outstanding side ears developed away from the general plane of the base, the ears having respectively generally U-shaped slots opening away from said plane of juncture for receiving a means to force the base to move over the off-set flange to seating and hooking position.

9. A combination as claimed in claim 1, said edging member being secured fluid tight on said panel and providing a means for mounting the bracket on the panel member so that both the edging member and the panel member remain intact upon mounting and removing a bracket.

10. A combination as claimed in claim 9, said keeper means being an edging member fluid tight on said other panel member and having an off-set flange directed away from the plane of juncture.

References Cited

UNITED STATES PATENTS

| | | | |
|---|---|---|---|
| 2,837,365 | 6/1958 | Schlueter | 292—240 |
| 2,853,751 | 9/1958 | Schlueter | 287—20.92 |
| 2,853,752 | 9/1958 | Schlueter | 287—20.92 |
| 3,271,059 | 9/1966 | Pearson | 24—73 X |

J. KARL BELL, Primary Examiner

U.S. Cl. X.R.

292—240; 287—20.92